United States Patent Office 2,834,705
Patented May 13, 1958

2,834,705

PROCESS FOR EDGE-GLUING WOODEN ELEMENTS

Stephen Marcucio, Derby, and Harold Brodsky, Wallingford, Conn., assignors to American Cyanamid Company, New York, N. Y., a corporation of Maine No Drawing. Application February 16, 1954
Serial No. 410,743

5 Claims. (Cl. 154—126.5)

This invention relates to adhesive compositions. More particularly this invention relates to a precatalyzed adhesive composition that possesses increased storage stability. Further this invention relates to an adhesive composition that finds particular use in the high-frequency edge-gluing of wooden elements. This invention also relates to the adhesives, the process of utilizing said adhesives and products produced therewith.

The employment of high-frequency electrical energy to cure or set the adhesive material finds wide-spread use in the edge-gluing of wooden elements in the production of veneer, wood laminations and plywoods. By utilizing high-frequency electrical energy in the edge-gluing of wooden elements, it is possible to rapidly unite small sections of wood, that otherwise would be discarded, into larger sections of wood which may then find use in the production of wood laminations, veneers and the like. It is customary to apply an adhesive material to the edges of the wooden elements which are to be united, securely clamp the elements together and then to pass the wood and the intervening adhesive joints through a high-frequency electrical field so that the adhesive is cured or set to bond the elements and thus form a unitary wooden piece. Various procedures are well known in the art for using the high-frequency energy. Thus, perpendicular and parallel heating are both employed. In the perpendicular heating the high-frequency electrical field is perpendicular to the adhesive lines so that both the intervening adhesive joints and the wooden elements which are to be united are heated simultaneously. In the parallel heating the high-frequency field is parallel with the adhesive lines and is applied to the intervening adhesive layers between multiple wooden elements which are being united. In the former process the wooden elements and the adhesive joints are heated simultaneously while in the latter the adhesive lines absorb substantially all of the heat during the set or cure of the joint. Obviously the pieces produced in accordance with this invention may then be in turn united with other pieces of wooden elements to produce still larger pieces or in some instances the piece may find use in itself.

The adhesive applied to the edges of the wooden elements being united is customarily applied as a water solution of the adhesive material. The edges of the wooden member with the intervening adhesive lines may then be securely clamped together immediately and united in the high-frequency electrical field or the pieces may be laid aside until a plurality of the edges is coated with the adhesive material and the several pieces then securely clamped together so that the pieces may then be united in a single production operation. Obviously the users of the adhesive in the production of the laminations or veneers will adjust the manner and the time at which the various wooden elements are united to suit their individual production schedules.

Many adhesives have been developed for use in the edge-gluing of wooden elements. Urea-formaldehyde resins have found wide acceptance in this field. However, one of the primary disadvantages of this type of adhesive is that a stable precatalyzed adhesive has not been generally satisfactory. For this reason it has been customary for adhesive supplies to offer to the trade a so-called two-package adhesive. This adhesive is, as the name implies, sold in two packages, one being the resinous material and the other being the catalyst or hardener therefor. The user of this adhesive must then combine the resinous adhesive material and the catalyst just prior to use. There have been various one-package adhesives developed which contain a precatalyzed adhesive but the storage stability of these adhesives is usually very short inasmuch as the adhesive has a marked tendency to set up or cure during storage at elevated temperatures.

It is an object of our invention to prepare a precatalyzed adhesive material of increased storage stability. It is a further object of our invention to prepare a precatalyzed adhesive material that finds particular employment in the high-frequency edge-gluing of wood laminations, plywood, veneers and the like. These and other objects of our invention will be discussed more fully hereinbelow.

We have now found that a precatalyzed adhesive composition may be prepared by combining within strict weight percentages a urea-formaldehyde condensation product, a melamine-formaldehyde condensation product, a certain group of latent catalysts or hardeners therefor and a metallic soap. The proportions of the urea-formaldehyde condensation products and melamine-formaldehyde condensation products employed in our invention must be maintained within certain definite proportions in order to obtain an adhesive possessing the desired qualities. Not only is an adhesive thereby obtained that has increased storage stability but also an adhesive is obtained that possesses increased washability, e. g., can be easily cleaned from the processing equipment after the various wooden elements have been united. We have found that from about 75% to about 86% by weight based on the total weight of the adhesive should comprise the urea-formaldehyde condensation product. The melamine-formaldehyde condensation product should comprise from about 10% to about 20% by weight based on the total weight of the adhesive composition. It is preferred, however, that the urea-formaldehyde condensation product comprise from about 79% to about 83% by weight and the melamine-formaldehyde condensation product comprise from about 14% to about 16% by weight wherein the weight percentages are based on the total weight of the adhesive composition. The adhesive is then added to a predetermined amount of water to form an adhesive ready for use. Usually from about 5 to about 7 parts of water, preferably about 5.5, are added to about 10 parts of the dry precatalyzed adhesive composition in order to form the usable mix.

The urea-formaldehyde condensation product employed in the production of the adhesive composition of our invention is water-soluble. These condensation products or resins are those which form colloidal solutions or dispersions as well as true solutions. Any formaldehyde reactable urea may be employed, e. g., urea, thiourea, ethylurea, etc. It is also possible to utilize aldehydes other then formaldehydes, e. g., benzaldehyde, furfuraldehyde, etc. Also, mixtures of the various ureas and aldehydes may be employed if desired.

A typical urea-formaldehyde condensation product employed in the preparation of the adhesive composition may be prepared as follows:

187 parts of a 37% aqueous formaldehyde solution and 62.2 parts of urea are charged into a suitable reaction kettle and the pH of the mixture is adjusted to about 7.8 to 8.0. The solution is then heated to reflux and is held at this temperature for about 15 minutes. The syrup is then cooled to about 90° C. and 13.8 parts of urea are added, the pH of the solution then being about 5.5 to 5.8. The mixture is then heated again to reflux and held at that temperature for two hours. The pH is raised to about 7.8 to 8.0 and the syrup is then cooled to about 25° C. The resultant syrup is spray dried by conventional techniques to yield finely divided soluble powder. The molar ratio of urea to formaldehyde must be carefully controlled from about 1.0:1.0 to about 1.0:2.0, respectively, in order to obtain the water-soluble condensation product. Preferably the molar ratio of urea to formaldehyde should be within the range of from 1.0:1.5 to about 1.0:1.75, respectively.

The melamine-formaldehyde condensation products herein employed are also water-soluble, e. g., from colloidal solutions or dispersions as well as true solutions. Aminotriazines other than melamine may be employed if desired, e. g., monophenyl melamine, diphenyl melamine, triphenyl melamine, ammeline, thioammeline, formoguanamine, acetoguanamine, stearoguanamine, and the like. It is also possible to use aldehydes other than formaldehydes in the preparation of the condensation product, e. g., benzaldehyde, furfural, and the like. Mixtures of the various aldehydes and aminotriazines can also be used.

A typical melamine-formaldehyde condensation product may be prepared as follows:

126 parts of melamine and 292 parts of 37% aqueous formaldehyde are charged into a stainless steel reactor equipped with agitator and reflux condenser. The pH of the solution is adjusted from about 6.9 to 7.2. The slurry is then heated to reflux temperature in 30 minutes and held at reflux temperature for 20 minutes. The pH of the solution is then adjusted to about 10 and the resultant clear solution is spray dried by conventional methods to yield a finely divided soluble powder. The molar ratio of melamine to formaldehyde should also be carefully controlled within the range of from about 3.0:1.0 to about 4.0:1.0, respectively, in order to obtain the water-soluble condensation product. It is preferred however that the molar ratio of melamine to formaldehyde be within the range of from about 3.5:1.0 to about 3.75:1.0.

We have found as a suitable catalyst which may be utilized in the adhesive composition of our invention an ammonium salt of a complex inorganic acid containing fluorine, e. g., ammonium fluosilicate, ammonium borofluoride, etc. Curing catalysts such as these have been used in the prior art, note U. S. Patents Nos. 2,388,143 and 2,413,624, but in each instance it was thought necessary to incorporate an anticaking or buffering agent into the adhesive composition in order to obtain increased storage stability. We have now found by our invention that it is not necessary to incorporate anticaking or buffering agents into the composition nor is it necessary to incorporate inert fillers therein in order to obtain an adhesive possessing increased storage stability. The amount of the curing catalyst incorporated into the composition should be within the range of from about 1% to about 2% by weight based on the total weight. By the employment of a curing catalyst as herein set forth and claimed, a precatalyzed adhesive composition may be produced and may be stored for periods greater than four months at elevated temperatures as high as 104° F. Inasmuch as the adhesive is precatalyzed, it is only necessary to add a predetermined amount of water to the composition in order to produce a usable adhesive.

Another essential ingredient of the adhesive composition of our invention is a metallic soap. These soaps are metal salts of long chain fatty acids. Examples of such ingredients are aluminum, chromium, zinc, calcium, magnesium, and barium salts of such fatty acids as the oleates, stearates, palmitates and the like. The amount of the metallic soap present in the formulation is usually within the order of about 2.5% by weight and accounts for the balance of the adhesive composition when the various proportions of the ingredients are selected as set forth hereinabove.

The following precatalyzed adhesive composition was prepared. This formulation is given solely by way of illustration and not limitation unless otherwise noted in the appended claims:

81.5 parts of the urea-formaldehyde condensation product prepared hereinabove, 14.8 parts of the melamine-formaldehyde condensation product prepared hereinabove, 2.47 parts of zinc stearate and 1.23 parts of ammonium fluosilicate were homogeneously blended to form the adhesive composition. To 10 parts of this adhesive was added 5.5 parts of water. The mix or pot-life of the aqueous solution of the adhesive was from 7 to 9 hours at 78° F. When wooden elements were edge-glued and cured in a conventional high-frequency electrical splicer, a uniform and completely cured bond was obtained when the tightly clamped pieces were fed through the splicer at the rate of 60 feet per minute and wherein the temperature in the splicer was in the order of 300° to 325° F. If it is desired, the wooden elements after being coated with the adhesive composition of our invention need not be immediately united. After coating the pieces with the adhesive, they may be laid aside for a period of as long as 3 days before being united in the splicer. Another distinct advantage of the adhesive composition is that any of the material that adheres to the various parts of the splicer may be easily removed by washing. Prior to our invention it was necessary to manually scrape off any of the adhesive adhering to the splicer after the cure of the adhesive bond.

We claim:

1. In the process for edge-gluing wooden elements wherein the edges thereof are coated with a layer of an adhesive, the edges tightly clamped together and the adhesive cured by the passage of a high-frequency electric current therethrough, the improvement which comprises employing as the adhesive a composition comprising from about 75% to about 86% of a urea-formaldehyde condensation product wherein the mol ratio of urea to formaldehyde is from about 1.0:1.0 to about 1.0:2.0, respectively, from about 10% to about 20% of a melamine-formaldehyde condensation product wherein the mol ratio of melamine to formaldehyde is from about 1.0:3.0 to about 1.0:4.0, respectively, from about 1% to about 2% of a hardening ingredient selected from the group consisting of ammonium fluosilicate and ammonium borofluoride and the balance being a metallic soap, wherein all percentages are based on the total weight of solids in said composition.

2. In the process for edge-gluing wooden elements wherein the edges thereof are coated with a layer of an adhesive, the edges tightly clamped together and the adhesive cured by the passage of a high-frequency electric current therethrough, the improvement which comprises employing as the adhesive a composition comprising from about 79% to about 83% of a urea-formaldehyde condensation product wherein the mol ratio of urea to formaldehyde is from about 1.0:1.0 to about 1.0:2.0, respectively, from about 14% to about 16% of a melamine-formaldehyde condensation product wherein the mol ratio of melamine to formaldehyde is from about 1.0:3.0 to about 1.0:4.0, respectively, from about 1% to about 2% of a hardening ingredient selected from the group consisting of ammonium fluosilicate and ammonium borofluoride and the balance being a metallic soap, wherein all percentages are based on the total weight of solids in said composition.

3. In the process for edge-gluing wooden elements wherein the edges thereof are coated with a layer of an adhesive, the edges tightly clamped together and the adhesive cured by the passage of a high-frequency electric current therethrough, the improvement which comprises employing as the adhesive a composition comprising from about 75% to about 86% of a urea-formaldehyde condensation product wherein the mol ratio of urea to formaldehyde is from about 1.0:1.5 to about 1.0:1.75, respectively, from about 10% to about 20% of a melamine-formaldehyde condensation product wherein the mol ratio of melamine to formaldehyde is from about 1.0:3.5 to about 1.0:3.75, respectively, from about 1% to about 2% of a hardening ingredient selected from the group consisting of ammonium fluosilicate and ammonium borofluoride and the balance being a metallic soap, wherein all percentages are based on the total weight of solids in said composition.

4. In the process for edge-gluing wooden elements wherein the edges thereof are coated with a layer of an adhesive, the edges tightly clamped together and the adhesive cured by the passage of a high-frequency electric current therethrough, the improvement which comprises employing as the adhesive a composition comprising from about 75% to about 86% of a urea-formaldehyde condensation product wherein the mol ratio of urea to formaldehyde is from about 1.0:1.0 to about 1.0:2.0, respectively, from about 10% to about 20% of a melamine-formaldehyde condensation product wherein the mol ratio of melamine to formaldehyde is from about 1.0:3.0 to about 1.0:4.0, respectively, from about 1% to about 2% of a hardening ingredient which is ammonium fluosilicate and the balance being a metallic soap, wherein all percentages are based on the total weight of solids in said composition.

5. In the process for edge-gluing wooden elements wherein the edges thereof are coated with a layer of an adhesive, the edges tightly clamped together and the adhesives cured by the passage of a high-frequency electric current therethrough, the improvement which comprises employing as the adhesive a composition comprising from about 79% to about 83% of a urea-formaldehyde condensation product wherein the mol ratio of urea to formaldehyde is from about 1.0:1.5 to about 1.0:1.75, respectively, from about 14% to about 16% of a melamine-formaldehyde condensation product wherein the mol ratio of melamine to formaldehyde is from about 1.0:3.5 to about 1.0:3.75, respectively, from about 1% to about 2% of a hardening ingredient which is ammonium fluosilicate and the balance being a metallic soap, wherein all percentages are based on the total weight of solids in said composition.

References Cited in the file of this patent

UNITED STATES PATENTS

| | | |
|---|---|---|
| 2,193,670 | Bigelow | Mar. 12, 1940 |
| 2,250,662 | Walter | July 29, 1941 |
| 2,323,831 | Menger et al. | July 6, 1943 |
| 2,372,178 | Corwin et al. | Mar. 27, 1945 |
| 2,434,573 | Mann et al. | Jan. 13, 1948 |
| 2,453,185 | Bilhuber | Nov. 9, 1951 |
| 2,574,784 | Heritage | Nov. 13, 1951 |

FOREIGN PATENTS

| | | |
|---|---|---|
| 974,363 | France | Sept. 27, 1950 |